Figure 1:
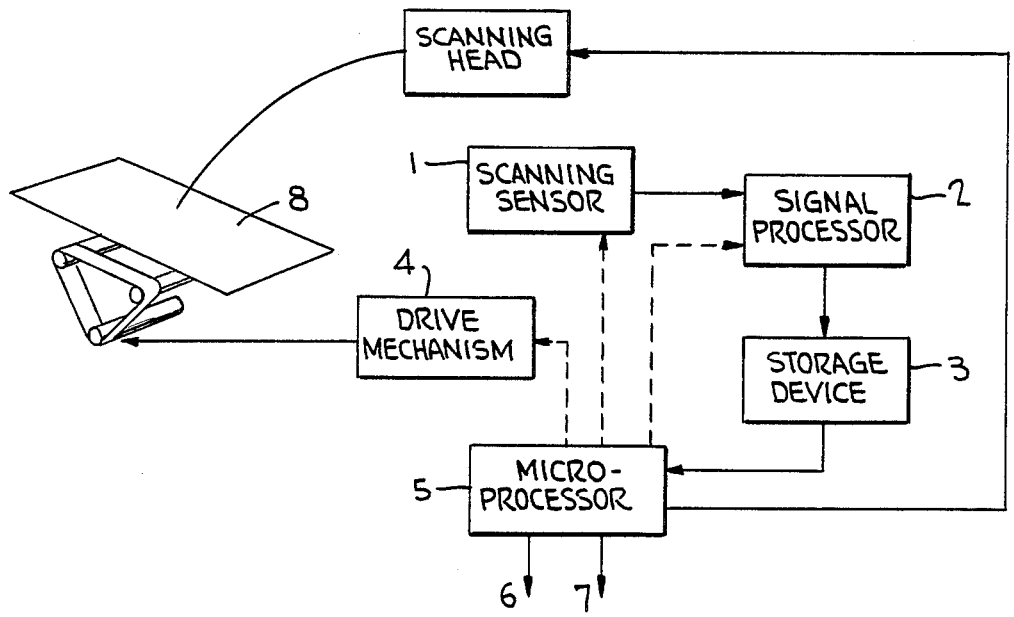

United States Patent [19]

Van Daele et al.

[11] Patent Number: 4,752,891
[45] Date of Patent: Jun. 21, 1988

[54] METHOD OF READING AN IMAGE IN A SCANNING APPARATUS HAVING A LIMITED BUFFER CAPACITY

[75] Inventors: Jean A. Van Daele, Bonheiden; Koen J. Van de Poel, Borgerhout; Joseph A. Soetaert, Rotselaar, all of Belgium

[73] Assignee: Agfa-Gevaert, N.V., Mortsel, Belgium

[21] Appl. No.: 784,235

[22] Filed: Oct. 4, 1985

[30] Foreign Application Priority Data

Oct. 23, 1984 [EP] European Pat. Off. ........ 84201529.9

[51] Int. Cl.[4] ............................ H04N 1/4; G06F 3/00; G06K 9/20
[52] U.S. Cl. ................................... 364/518; 358/285; 358/294
[58] Field of Search ............... 364/518, 525, 550, 560; 356/394, 398; 250/578; 358/280, 285, 288, 293, 294

[56] References Cited

U.S. PATENT DOCUMENTS

| | | | |
|---|---|---|---|
| 4,367,493 | 1/1983 | Matteson | 358/288 |
| 4,523,234 | 6/1985 | Sangu | 358/285 |
| 4,628,368 | 12/1986 | Kurata et al. | 358/288 |
| 4,631,596 | 12/1986 | Yaguchi | 358/280 |
| 4,651,221 | 3/1987 | Yamaguchi | 358/294 |

Primary Examiner—Parshotam S. Lall
Assistant Examiner—Daniel W. Juffernbruch
Attorney, Agent, or Firm—A. W. Breiner

[57] ABSTRACT

A method and an apparatus are described for digitization of an image and for transmission to a host device of the digitized image via a buffer memory having a signal storage capacity that is lower than the data content of said digitized image. Different portions of the image are stored in the memory during successive separated periods of time. To this end the image is repeatedly scanned by means of radiation emitted by radiation projecting means that are transported at a constant scanning speed from a boundary outside the image beyond the image portion to be stored.

8 Claims, 2 Drawing Sheets

METHOD OF READING AN IMAGE IN A SCANNING APPARATUS HAVING A LIMITED BUFFER CAPACITY

DESCRIPTION

1. Field of Invention

The present invention relates to a method of digitizing images and transferring the digitized images to a host device. The invention also relates to image digitizing and transmitting apparatus.

2. Background of Invention

The production of digitized images for transmission to a so-called "host device", is well known and finds useful application in the transmission of all kinds of graphic images, e.g. textual matter, drawings and other pictorial matter, logograms, signatures and fonts. The transmitted digitized can be supplied to a said host device for storage, printing, visual display, editing or other tuxtual processing, phototypesetting or some other purpose.

The digitization of the image is achieved by scanning the image with light, converting information-wise modulated reflected or transmitted light into a video signal by means of light sensor means, e.g. metal oxide semiconductors (MOSs), photodiodes, phototransistors or charge coupled devices (CCDs), and using an electronic analog to digital converter to convert the video signal to a digitized (binary code) video signal. The digitized video signal can be formatted by electronic signal processing means before its transmission to the host device.

It is known to load digitized image data from the scanner into a data storage device or so-called buffer memory from which the data is then transferred to the host device. The intermediate storage facility affords the advantage tht the dataflow from the scanner can, within limits, exceed the acceptance capability of the host device. Many host devices are incapable of processing data at rates matching the rate at which scanning can and should proceed.

For digitization purposes a graphic image is interpreted as a sequence of pixels the quantity of which depends on the image area and the chosen resolution. If use is made of a buffer memory of sufficient capacity to store all of the digitized pixels composing the image, the image can be digitized during a single continuous linewise scanning operation and extremely fast digitization is possible.

A problem arises however when it is required to transmit an image whose digitized pixel content exceeds the capacity of the buffer memory. It is not economically attractive to provide a memory having a very large capacity in relation to average needs because the cost of a memory and the appropriate memory control circuitry increases markedly with its size and the larger the memory the less frequently will its capacity be fully utilised. In many instances of use of an information transmission method of the kind under discussion, only a small amount of image data has to be transmitted as a single file. That information may for example be a signature or logogram which is required to be printed by a high resolution printer and which forms but a small part of the graphic information on the sheet on which the signature or logogram appears. For such instances of use it would suffice for the buffer memory to have a comparably small storage capacity such as would give a significant cost advantage. However apparatus which had to be dedicated to the scanning and transmission of small amounts of information would be of limited use.

A solution to the foregoing problem which has already been proposed involves scanning sections of an image in successive periods of time separated by a interval of time. For this purpose the scanning movement of the light source and sensor means relative to the graphic image, or vice versa, is interrupted. In other words it is a stepwise movement. Interrupted scanning makes it possible to digitize, store and transmit an image having a pixel content exceeding the storage capacity of the buffer memory provided the time interval(s) between the scanning of the successive image sections is (are) sufficient to allow unloading of the stored data to the host device.

When using the known interrupted scanning procedure it is difficult to achieve high fidelity image digitization. The stepwise displacements involve deceleration and acceleration of the scanner drive mechanism to and from zero while scanning and digitization are in progress. Because of vibrations it is difficult to avoid video signal distortion and misalignment (joining errors) at and adjacent the positions at which one transmitted image section joins another. In order to keep distortion and misalignment to a minimum it is necessary to use a very heavy scanner construction, with the penalty tht the displaceable components have a high inertia such that the maximum digitization speed is severely restricted.

OBJECTS AND GENERAL DESCRIPTION OF INVENTION

It is an object of the present invention to provide for the high fidelity digitization of a graphic image and its transmission to a host device via a buffer memory having a storage capacity lower than the pixel content of the digitized image. At the same time the invention aims to permit the rate of transmission to the host device to be lower than that of the data transfer into the said memory.

According to the present invention there is provided a method of digitizing and transmitting a graphic image, such method comprising line-wise scanning different sections of the image in successive separated periods of time by electromagnetic radiation, intercepting imagewise modulated radiation by sensor means, converting the image-wise modulated radiation sensed in such successive time periods into successive digitized video signals, and successively transmitting the successive digitized video signals to a host device via a buffer memory having a bit storage capacity insufficient for storing the complete digitized image, characterised in that each of said image sections is scanned and digitized during a relative displacement between radiation projectionmeans and the image from a positional relationship in which the radiation beam path lies outside the boundary of the image to be transmitted, and each such relative displacement continues until the radiation has swept beyond the image section which is digitized during that displacement.

For practical purposes by electromagnetic radiation is meant infrared radiation, visible light and ultraviolet radiation.

By reason of the relative displacement pattern between the radiation projection means and the image, this method makes it easier to obtain a distortion-free video signal. The said relative displacement pattern does not entail the starting and stopping of mechanical scanner components during scanning of the graphic image sections. Consequently vibration is less of a problem.

The required displacement pattern can be achieved by mounting the image on a drum or like carrier which is unidirectionally rotated to carry the image past the radiation projection means a number of times equal to the number of image sections to be successively scanned and digitized. Such a scanning system is suitable for digitizing an image carried by a flexible sheet which can be conformed and attached to the rotatable carrier.

The required relative displacement pattern is however preferably achieved by the procedure of reciprocating the radiation projection means relative to the image, the latter being held stationary. Such procedure is preferred because it is more versatile in respect of the image-carrying documents which can be handled. For example images on the pages of a book of virtually any thickness can be scanned and digitized.

For simplification of the description it will hereafter be assumed that scanning is performed by reciprocating a scanning head (which carries radiation projection means), relative to the image, the image being stationary. The manner in which the invention can be performed using alternative procedures will be apparent without explanation.

Each of the displacements of the scanning head in which scanning of a section of the image takes place can commence from a position which is so far outside the projected boundary of the image that the scanner is substantially free from vibration during the actual scanning of such image section, even if the scanner is of relatively light-weight and has a rapidly reciprocating low-mass scanning head. In consequence, scanning and digitization can be effected in a much shorter time than when using the known step-wise scanning procedure. The minimum interval of time which must elapse between the scanning and digitization of successive image sections is of course dependent on the maximum acceptance rate capability of the host device which is interfaced with the scanner, because the digitized image data stored in the buffer memory has to be read out to the host device within that time interval. However because the scanning head can be reciprocated at high speed without giving rise to intolerable signal distortion, the image digitizing and transmission method according to the invention can be used not only for feeding host devices with slog signal processing speeds but also for feeding relatively fast working host devices, e.g. devices having a signal processing capability up to 19200 baud or even higher.

The relative displacement between the radiation projecting means and the image preferably occurs at a constant speed during the whole of the periods in which image sections are scanned and digitized.

Procedures for confining digitization to a selected part of a graphic original are known, and involve what is called a "windowing" or "framing" technique. This is frequently used for example in the digitization of logograms, pictorial insets and signatures which occupy only a small part of the sheets on which they appear.

The control of digitization so that, during any given displacement of the scanning head, it occurs only in respect of a section of the image, lying within a certain "window" or "frame", can be effected automatically by a microprocessor, e.g. in dependence on signals from the host device or under the control of an operator controlling the scanner.

The successive displacements of the scanning head during which the successive scanning phases (the scanning of different image sections) occur can be monitored by means which is functionally connected to the video signal generating circuit to ensure that in the second and any subsequent scanning phase, digitization commences at the appropriate point for continuity with the image section digitized in the preceding phase.

The number of pixels which are scanned and digitized in the or each scanning phase save the last one can be such that the corresponding digital signal bits completely fill the buffer memory. Only exceptionally will the number of pixels to be digitized in the last phase exactly equal the bit storage capacity of the memory.

Preferably however, digitization in each scanning phase, or in the or each scanning phase save the last, is terminated on completion of scanning and digitization of a number of complete image pixel lines such that the buffer memory is full or incapable of storing data bits representing another complete line of pixels. The maximum number of complete digitized pixel lines which can be stored is a function of the image dimensions and the chosen resolution. Consequently in the or each scanning phase save the last, the moment at which scanning and digitization should stop can be identified in terms of a position of the scanning head, and that position can be determined on the basis of the said image dimension and resolution parameters.

Preferably the position of the scanning head during each of its displacements in which scanning of an image section occurs is monitored in terms of its distance from a certain reference or datum position. The location of a said reference or datum position can be detected automatically so as to derive a signal for setting or initiating operation of a scanning head position monitor. Digitization control signals can be derived in dependence on the operation of the monitor to ensure that digitization of a second or subsequent image section commences at the appropriate point in relation to that at which digitization in the preceding phase was terminated.

As has already been suggested, the line-wise scanning can be performed so that all pixels in each scanning line are irradiated simultaneously or one after another, e.g. using a laser beam. The former is the preferred scanning method. For simultaneously irradiating the pixels of one line a plurality of radiation sources or a source of irradiation extending over the total width of the image to be scanned is required. The image-wise modulated radiation quanta can be directed by a set of mirrors and focused by a lens onto radiation-sensitive sensors. A single radiation source can be used if the scanning beam is deflected towards each pixel. The movements of the scanning beam along each pixel line can be accomplished using an oscillating deflector, e.g. a mirror.

The invention includes image digitizing apparatus for interfacing with a digital signal processor: a "host device".

Apparatus according to the invention comprises an image scanner having means for projecting scanning radiation towards an image plane, a work support for supporting an image-bearing sheet in said plane, drive mechanism for automatically causing said radiation projection means and said support to undergo a sequence of relative displacements appropriate for causing successive sections of said support area to be scanned in successive said relative displacements, means for sensing image-wise modulated scanning radiation, a convertor means for converting the image-wise modulated radiation into a digitized video signal, and a digital signal storage device to which said convertor means is connected and which is adapted to be connected to a signal processor so as to serve as a buffer memory between the scanner and said processor, characterised in that the apparatus includes drive control means by which the said drive mechanism can be caused to effect said relative displacements of the radiation projecting means and said sheet support from or via a common positional relationship (hereafter called "datum position") of those parts; and there is control means for causing digitized video signal generation during each said displacement to be automatically initiated and terminated when the said parts are in certain predetermined relationships relative to said datum position, such that the signal generation commences after the start of that displacement and terminates before the end thereof.

Preferably the sheet support is fixed and the said drive mechanism is constructed to bring about said relative displacements by reciprocating the radiation projecting means relative to such support.

THE DRAWING AND PRESENTLY PREFERRED EMBODIMENT

Figure 2:
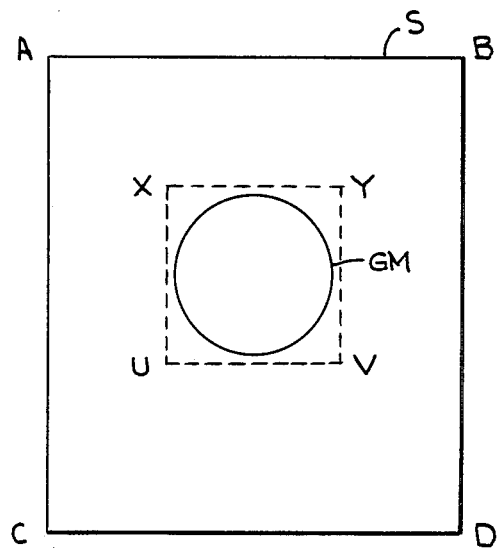
Figure 3:
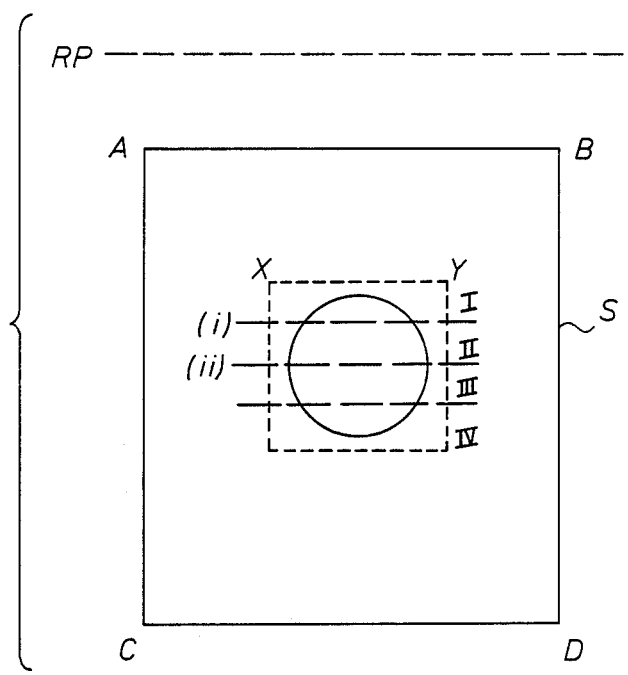
Figure 4:
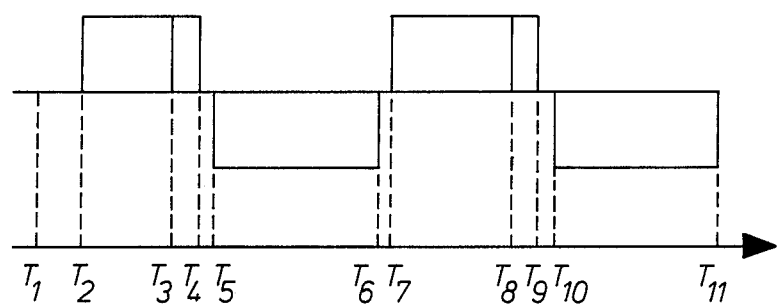

The present invention will become fully understood from a detailed description given hereinbelow and from the accompanying drawings which are given by way of example and are not limitative of the present invention and wherein, In the drawings, FIG. 1 is a simple block diagram of an apparatus according to the present invention, FIG. 2 represents a sheet S bearing graphical matter GM which is to be transmitted, FIG. 3 illustrates the method of the present invention used for scanning and digitizing graphic matter on a sheet S, FIG. 4 represents part of an image scanning and digitizing cycle as a waveform timing diagram.

The drawings relate to an apparatus having a fixed transparent platen 8 for supporting a sheet or other document carrying the image to be digitized. The scanner components include a scanning head in the form of a carriage which is reciprocatable by drive mechanism, under the control of a microprocessor, along a track opposite the platen. The scanning head carries a scanning light source. Light is emitted towards the document and the image-wise reflected light is directed by means of a mirror to a fixed focusing lens which focuses the light into fixed sensor means 1 formed by a linear array of 1728 integrated charge coupled devices by means of which the intensity pattern of the reflected light is converted into an analog video signal representing the scanned image.

The detected analog video signal is processed and binarised by electronic signal-processing means 2. The signal processing is for signal normalisation purposes to compensate for variable working conditions and for the grey value in individual pixel signals induced by imperfections in the optical lens/sensor system.

After signal-processing, the binary information is stored in a storage device 3 that acts as a synchronising element between the digitizer and a host device. This storage device, commonly called a buffer memory, has a limited data storage capacity. In a preferred embodiment the buffer memory is a random access memory device having a data storage capacity equal to 1 Mbit.

This storage capacity is adequate for the storage of a digitized image up to a certain size which depends on the resolution. For example: at a digitized image resolution of 100 dots per inch in both the side to side and the top to bottom directions, the buffer memory 3 can store, on the fly, the image of an entire page of DIN A4 size. An entire DIN A4 page can in that case be linewise scanned and digitized by a single continuous displacement of the scanning head along the original.

If however, because of the size of the original image to be digitized or the chosen resolution, the number of bits in the required digitized image exceeds the storage capacity of the buffer memory, a drive mechanism 4 of the scanning head, which mechanism preferably comprises a DC motor, operates under the digital control of a microprocessor 5 to scan the image section by section in a sequence of two or more displacements of the scanning head. One dimension of the image sections or "windows" which are scanned during the or each such displacement, namely the dimension parallel with the scanning lines, is determined by and equal to the corresponding dimension of the image itself. The other dimension (hereafter called "the perpendicular dimension") of each window prior to the last one is such that it covers the maximum number of complete lines of pixels which can be stored in the buffer memory. Unless the total number of pixels composing the original image is a whole number multiple of the storage capacity of the memory, the memory will be only partly filled during the scanning of the last image section. The said perpendicular dimension of all but the last window can be predetermined by the microprocessor 5 from the dimensions of the image to be scanned and the selected resolution, and such factors can be supplied as input to the microprocessor from the host device or by the scanner operator using a scanner keyboard. Alternatively the said perpendicular dimension can be determined during the scanning operation by arranging for the scanning and digitization occurring during each stroke of the scanner head to be terminated automatically by a signal from the buffer memory when it has been loaded with as many complete lines of digitized pixels as the memory can hold.

FIG. 2 represents a sheet S (FIG. 2) bearing graphic matter GM which is to be transmitted. For scanning and digitization purposes a rectangular area XYUV is selected as the area to be scanned and this selection is fed into the microprocessor 5 or into a microprocessor forming part of the host device, in terms of the co-ordinates of two diagonally opposed corners, e.g. XV, with respect to a fixed origin. The microprocessor, on the basis of this data, confines digitization to the area XYUV. In other words, the image which will be digitized and transmitted is the entire surface of that area.

Referring now to FIG. 3: when the sheet S has been properly mounted on the platen of the scanner, the scanner is switched on to commence scanning. On command of the microprocessor the scanning head commences a first stroke from its rest position. This rest position is indicated by the broken line RP in the figure. In this rest position the light from the scanning light source is outside the sheet edge AB. The scanning head accelerates from its rest position until it is nearly opposite sheet edge AB and the head then continues its stroke at a constant speed. The displacement of the scanning head is monitored with reference to a datum position. When the scanning head reaches that position a projection on the head trips a microswitch, causing a signal to be transmitted to the microprocessor. This signal initiates operation of a counter which monitors the continued movement of the scanning head and registers its position at any given instant. Under command of the microprocessor, analog video signal transmission and conversion to a digitized video signal commences when the scanning head reaches a position corresponding with the incidence of the scanning light beam on line XY and continues until a predetermined number of pixel lines has been scanned. This number is determined by the microprocessor on the basis of the length of each scanning line (the original image dimension X-Y) and the selected resolution and is such that the buffer memory 3 (FIG. 1) could not store a further series of bits representing another complete line of pixels. On termination of the video signal generation the scanning light beam (which remains switched on at all times during operation of the scanner) is at the position of line (i) in FIG. 3 and the buffer memory has been loaded with bits representing the image section I. The speed of the scanning head remains constant until the video signal generation has terminated and the head is then decelerated to zero within a short distance beyond line (i). Then the scanning head returns to its rest position RP. During this return motion the data bits stored in the buffer memory commence to be unloaded to the host device with which the digitizer is interfaced. The unloading will be complete by the time digitization of the next image section commences.

The speed at which the scanning head moves past the document depends on the scanning resolution and on the speed at which the charge coupled device array is read out. When the charge coupled device array is read out at 1.5 megapixels per second and the resolution is set at 400 dots per inch, the scanning speed is 1.8 cm per second. The speed at which the scanning head returns to the rest position is 10 cm per second and is independent of the resolution or the read-out rate.

Immediately after its return to its rest position the scanning head commences its second stroke and it again reaches its constant scanning speed by the time it reaches the sheet edge AB. As in the first stroke, operation of the head displacement monitoring counter is initiated at that point by tripping of the microswitch hereinbefore referred to. In this second stroke, video signal production commences under command of the microprocessor when the scanning head reaches a position in which it can scan the pixel line immediately following image section I. And the video signal production continues for the same number of pixel lines as before, thereby again filling the buffer memory with the data bits of as many complete pixel lines as possible. On termination of this signal production the scanning light beam is at the position of line (ii) in FIG. 3 and the buffer memory has been loaded with bits representing the image section II. The described control of digitization by means of head position monitoring enables image digitization to be achieved with a joining error as small as one dot, between successive image sections.

The foregoing operations are repeated for digitizing the remaining image sections III en IV.

Because the scanning head is in continuous motion during the whole of the time that image scanning and video signal production are in progress, the scanning head and associated moving parts can be of relatively light weight without risk of image distortion by vibration and the scanning head can be reciprocated very quickly as will be hereafter be exemplified. Consequently although there is a time interval between the transmission of successive digitized image sections to the host device, this time interval can be very short, although it must of course be sufficient to allow the buffer memory to unload. The successively digitized and transmitted image sections are transmitted as a single file, which may be preceded and followed by "beginning of file" and "end of file" codes in accordance with practice known per se.

The digitized image data are transmitted from the image digitizer to the host device via an interface bus. The digitizer is provided with an output port 6 (FIG. 1) for the connection of a standardized, serial, asynchronous RS 232 C interface bus, operating at 19200 bits per second (commonly called 19200 BAUD).

The digitizer can also be provided with an output port 7 for the optional connection of a byte parallel interface, preferably an IEEE 488 interface bus.

Part of an image scanning and digitizing cycle of the above described apparatus is represented as a waveform timing diagram in FIG. 4.

$T_2$ minus $T_1$ is the run-up period of the scanning head drive motor during which the scanning head moved from its rest position RP to its datum position by which time it reaches its constant working speed.

$T_3$ minus $T_2$ is the period of time taken for the scanning head to travel from its datum position to line XY at which scanning of the first image section commences.

$T_4$ minus $T_3$ is the period of time during which the first image section is scanned.

$T_6$ minus $T_5$ is the time during which first image section data bits are transmitted from the buffer memory 3 to the interfaced host device.

The scanning head returns to its rest position RP while the first image section data bits are being unloaded from the buffer memory. The head then commences its second displacement for scanning the second image section II.

$T_8$ minus $T_7$ is the period of time taken during this second displacement for the scanning head to travel from its datum position to line (ii) at which scanning of the second image section commences.

$T_8$ minus $T_7$ is larger than $T_3$ minus $T_2$ because the distance from the datum position to the first line of the second image section is larger than the distance from the datum position to the first line of the first image section and the speed of the carriage is the same in both movements.

$T_9$ minus $T_8$ is the period of time during which the second image section is scanned. This period of time is the same for all the image sections except the last one because the microprocessor divides the image area as far as possible into sections each of which contains the maximum number of complete pixel lines which can be stored, in digitized form, in the buffer memopry. The last image section may of course have a smaller data content than the preceding ones.

$T_{11}$ minus $T_{10}$ is the period of time during which the data bits representing the second image section are transmitted. The described operations are repeated as many times as are necessary to complete the image digitization and transmission.

It will be apparent that the described embodiment of the method and apparatus can be varied in many ways within the scope of the invention.

What is claimed is:

1. A method of digitizing and transmitting an image by line-by-line scanning of different sections of an image in successive separated periods of time said method comprising projecting electromagnetic radiation onto said image by a radiation projections means, intercepting modulated radiation from said line-by-line scanning of different sections of the image by a sensor means, converting said modulated radiation sensed in said successive time periods into successive digitized video signals, and successively transmitting the successive digitized video signals to a host device via a buffer memory having a bit storage capacity insufficient for storing the complete digitized image the improvement wherein each of said image sections is scanned and digitized durng a relative displacement of said radiation projection means with respect to said image by (a) starting the scanning of each section from a position wherein the radiation beam path lies outside the boundary of the image to be transmitted; (b) continuing said scanning uninterrupted until the radiation from the radiation projection means sweeps beyond the image section to be digitized means sweeps beyond the image section to be digitized during said scanning, including when image transmission is discontinued as a result of said buffer memory being temporarily filled; and (c) re-scanning the section where said discontinuation occured and continuing the transmission of the image at the position where said image transmission was discontinued without there being an omission in said transmitted image.

2. A method according to claim 1 wherein the radiation projecting means is reciprocated relative to the image, the image being stationary.

3. A method according to claim 1 or 2 wherein the relative displacement of the radiation projecting means with respect to the image occurs at a constant speed during the whole of the periods in which image sections are scanned and digitized.

4. A method according to claim 1 or 2 wherein digitization in each of said periods of time is terminated on completion of scanning and digitization of a number of complete image pixel lines in order that the buffer memory is full or incapable of storing data bits representing another complete line of pixels.

5. A method according to claim 1 or 2 wherein the position of said radiation projection means during said scanning is monitored in terms of its distance from a reference position.

6. An image digitizing apparatus for interfacing with a host device, which apparatus comprises an image scanner having means for projecting scanning radiation towards an image plane, a work support for supporting an image-bearing sheet in said plane, drive mechanism for automatically causing said radiation projection means and said support to undergo a sequence of relative displacements appropriate for causing successive sections of said image plane to be scanned in successive said relative displacements, means for sensing modulated scanning radiation, a convertor means for converting the modulated radiation from said scanning into a digitized video signal, and a digitized video signal storage device to which said convertor means is connected and which is adapted to be connected to a signal processor so as to serve as a buffer memory between the scanner and said processor, the improvement wherein the apparatus includes drive control means by which the said drive mechanism can be caused to effect said relative displacements of the radiation projecting means with respect to said sheet support from a common positional relationship of the radiation projection means and the work support; the control means causing digitized video signal generation during each said displacement to be automatically initiated and terminated such that the video signals are terminated when the buffer memory is temporarily filled, and when a re-scan occurs from a position before the position where the video signals were terminated, the video signals are initiated when the radiation projection means with respect to the work support is in the same relative position as when the video signals were terminated.

7. Apparatus according to claim 6 wherein the sheet support is fixed and said drive mechanism is constructed to bring about said relative displacements by reciprocating the radiation projecting means relative to said support.

8. Apparatus according to claim 6 or 7 wherein there is detector means for detecting a position that is treated as said common positional relationship by said video generating control means.

* * * * *